March 11, 1930.  A. B. McDONALD  1,750,536
COTTON BOLL PICKER
Filed Dec. 27, 1926  3 Sheets-Sheet 1

A. B. McDonald, Inventor

By Richard B. Owen
Attorney

Witnesses
C. E. Churchman
Geo. H. Forbes

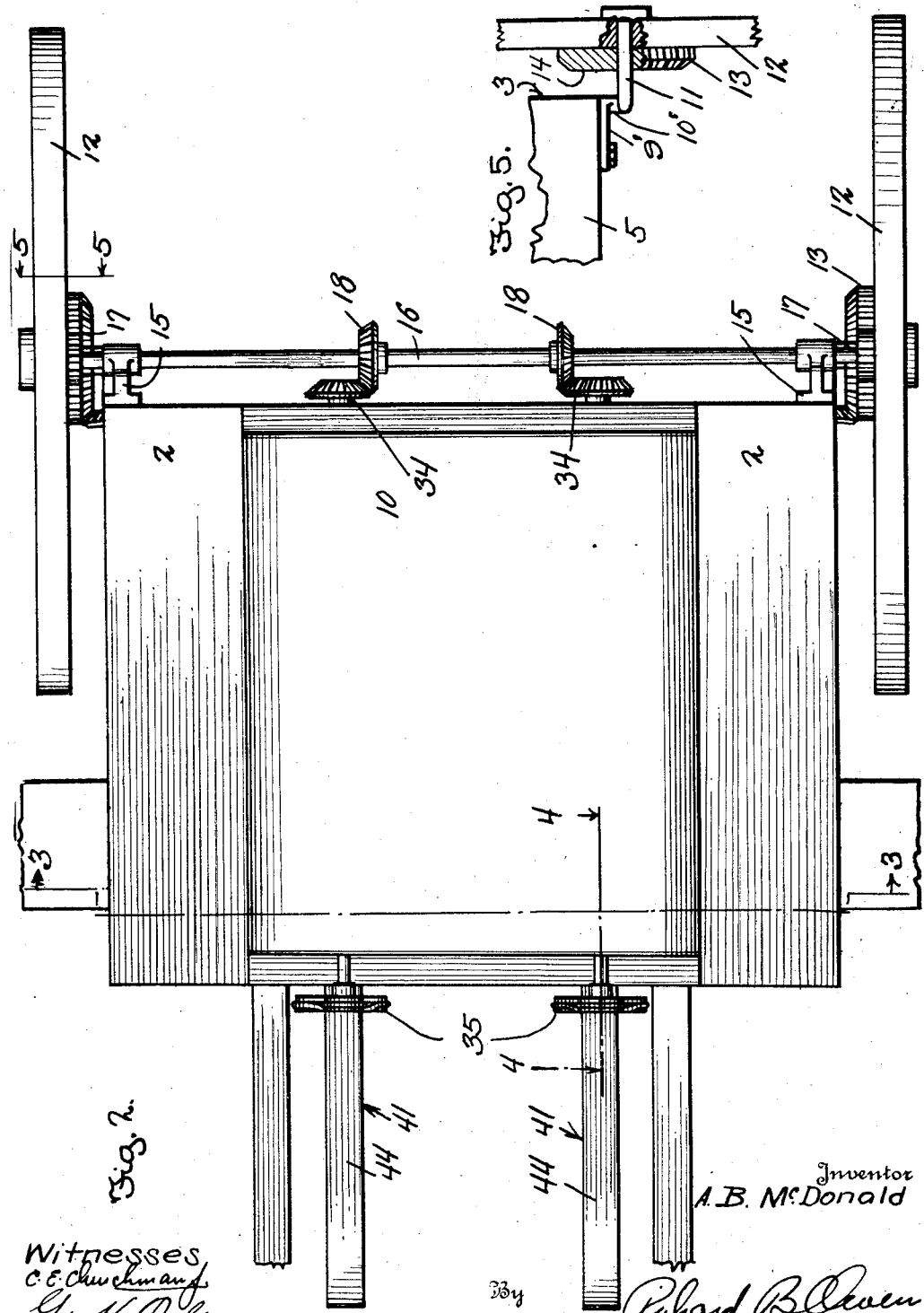

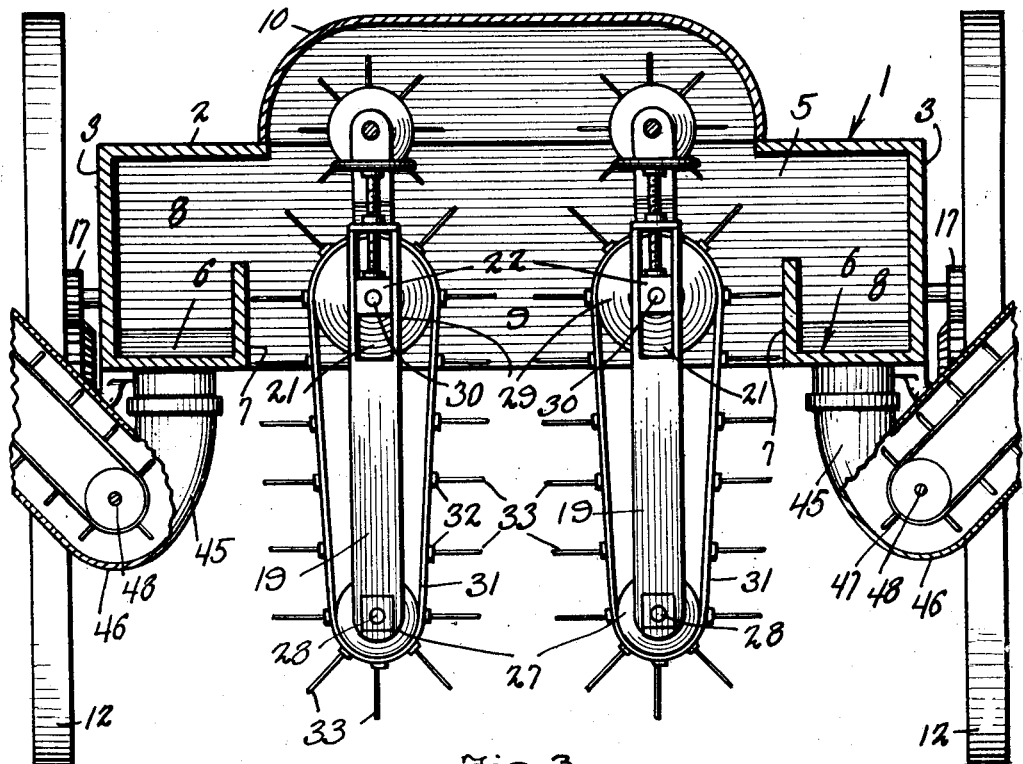

Patented Mar. 11, 1930

1,750,536

UNITED STATES PATENT OFFICE

ALBERT B. McDONALD, OF VERNON, TEXAS

COTTON-BOLL PICKER

Application filed December 27, 1926. Serial No. 157,397.

This invention relates to improvements in a machine for picking cotton bolls.

The primary object of this invention is to provide, in a manner as hereinafter set forth, a machine designed to pass over cotton plants and remove therefrom the unmatured or withered bolls which remain after the cotton has been removed from the plant.

Another object of the invention is to provide a machine for removing cotton bolls which will strip a plant from both sides simultaneously.

A still further object of the invention is to provide in a machine employing an endless series of picker fingers for removing cotton bolls from the plant, a means for removing the bolls from the picker fingers after the same have carried the bolls to the interior of the machine.

Other objects and advantages of the machine will become apparent as the description of the same proceeds, and the invention will be best understood from a consideration of the following detailed description taken in connection with the accompanying drawings forming a part of this specification, with the understanding however, that the invention is not confined to any strict conformity with the showing of the drawings but may be changed or modified so long as such changes or modifications mark no material departure from the salient features of the invention as expressed in the appended claims.

In the drawings:

Figure 2 is a top plan view of the machine.

Figure 3 is a transverse section taken upon the line 3—3 of Figure 2.

Figure 4 is a section taken upon the line 4—4 of Figure 2.

Figure 5 is a rear view of one lower end of the picker machine body showing a portion of the traction wheel and beveled gear associated therewith in section.

Figure 1:
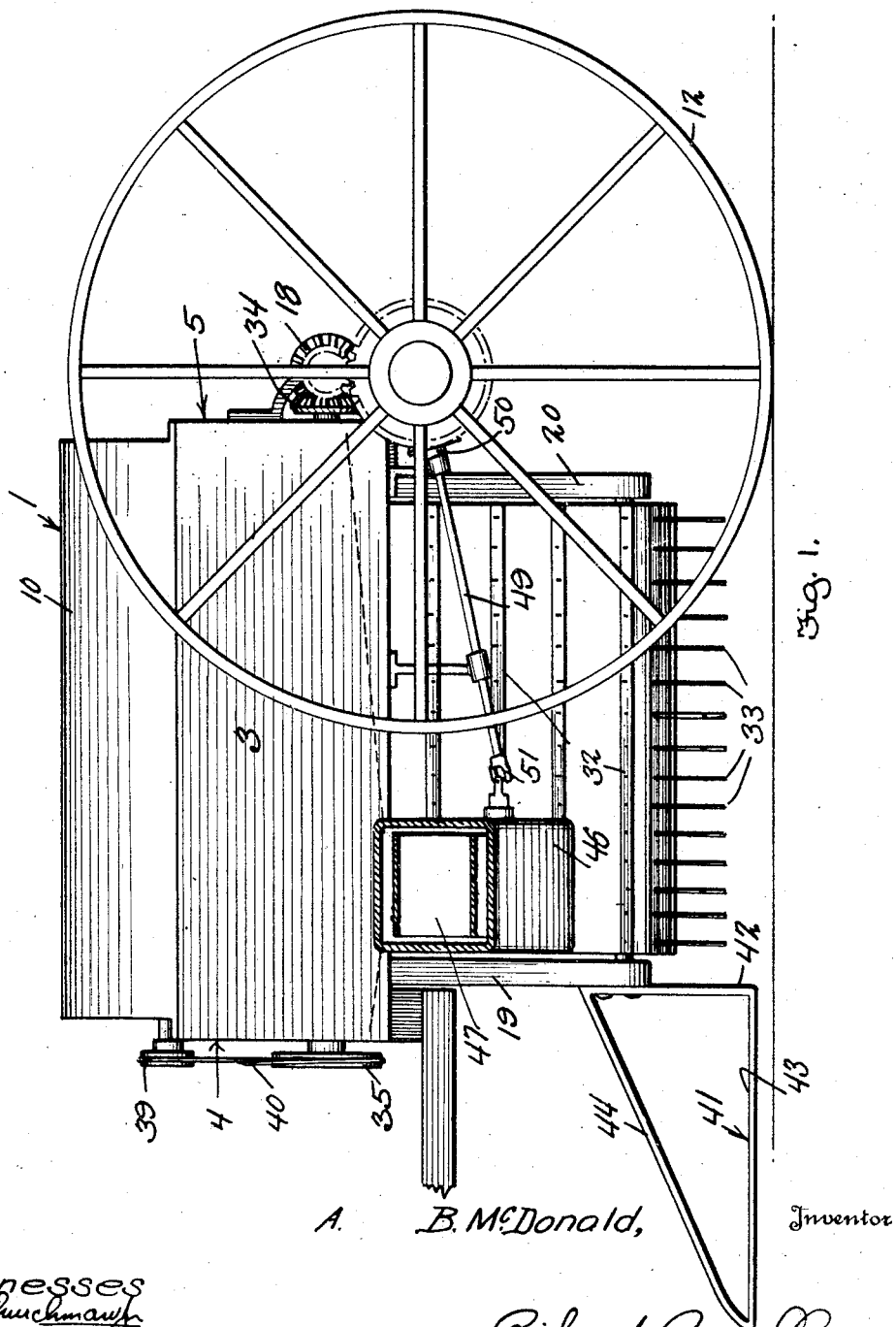
Figure 1 shows the machine embodying this invention in side elevation.

Referring now to the drawings in detail wherein like numerals of reference indicate corresponding parts throughout the several views, the numeral 1 indicates generally the picker machine body, which body as shown comprises a housing having the top 2, the side walls 3 and end front and rear walls 4 and 5 respectively, the housing having at its under side adjacent each side wall 3 the narrow floor section 6 which extends from the front to the rear wall of the machine and at its inner edge terminates in the upstanding wall 7 thus setting upon each side of the housing a bin 8.

Opening downwardly through the housing 1, between the bins 8, is a well 9 and overlying the well 9 and opening through the top 2 of the housing, is a hood structure 10 which extends from the front to the rear of the housing as shown in Figure 1.

Secured to the under side of the housing 1 upon each side and adjacent the rear thereof is a bracket carrying plate 9' having extending therefrom the downwardly and rearwardly projecting arm 10' which terminates in a laterally extending stub axle 11. Upon the stub axle of each of these bracket plates, a traction wheel 12 is mounted and secured to each of these traction wheels concentric therewith is a mechanism driving gear 13 having secured against its inner face a beveled gear 14.

Secured to and extending from the back wall 5 of the vehicle housing at each side thereof, is a shaft supporting bracket 15, each carrying one end of a shaft 16 which extends transversely of the rear of the housing and beyond each side thereof and has upon each end the pinion gear 17, which meshes with the adjacent drive gear 13 carried upon a traction wheel. This shaft 16 carries adjacent its central portion, a pair of spaced beveled pinion gears 18 which are fixed to revolve with the shaft.

Secured to the opposed inner faces of the front and rear walls 4 and 5 is a pair of vertically arranged belt roller carrying columns 19 and 20, the columns 19 being secured to the front wall and the columns 20 being secured to the rear wall of the structure. As is shown in Figure 3, the upper ends only of the columns are secured to the walls of the housing 1, a major portion of the columns extending downwardly a substantial distance.

The upper portion of each of the columns 19 and 20 is provided with a longitudinally extending slot 21 in which is slidably mounted a bearing block 22, and mounted upon the upper end of each of the columns 19 and 20 is a supporting bracket 23 having the laterally projecting foot portion 24 secured across the top of the adjacent column and provided with a central threaded aperture through which an adjusting screw 25 is passed the lower portion of each screw being swivelly connected to the adjacent bearing block 22 while the upper end carries the hand wheel 26. The upper ends of the columns 19 only are shown with the longitudinal slots 21 therein but it is of course understood that the upper ends of the columns 20 must be constructed in a like manner for the proper operativeness of the machine.

Arranged between the lower ends of the aligned front and rear columns 19 and 20 is a roller 27 having each end provided with a trunnion 28 which is revolubly mounted in the end of the adjacent column. Parallel with each of the lower rollers 27 is an upper roller 29 of larger circumference than the lower roller extending between the upper ends of the aligned front and rear columns and having extending from each end a trunnion 30 which is mounted in an adjacent sliding bearing block 22.

Extending over each pair of parallel superposed rollers 27 and 29 is an endless belt 31 which has a plurality of transversely extending spaced slats 32 secured to the face thereof, from each of which slats there projects a longitudinally extending series of picker fingers or pins 33.

Each of the trunnions 30 of the upper rollers 29 is extended through the front and rear walls of the housing and at the rear ends of the rollers the respective roller pinions each carries thereon a beveled gear 34 which meshes with an adjacent gear 18 upon the shaft 16. At the other end of each roller, each of the extended trunnions carries forwardly of the front wall 4 a grooved pulley wheel 35.

Arranged above and parallel with each of the upper conveyor belt rollers 29, between the upstanding ends of the brackets 23, is a picker brush cylinder 36, from the face of which there extends the plurality of brush fingers 37 and each end of each of the rollers or cylinders 36 carries a stub shaft 38 which extends through and has bearing in an adjacent bracket 23, and each of these stub shafts 38 at the forward end of each cylinder is extended beyond the front wall 4, and carries thereon a grooved pulley wheel 39 which is of less diameter than the pulley wheels 35 and is connected by a pulley cord 40 with the underlying pulley wheel 35, the cord 40 being twisted to cause the brush cylinders 36 to revolve counter to a direction of revolution of the underlying belt rollers. It will also be seen that the brush members are adapted to revolve at a greater speed than the picker belts and the cylinders for the purpose hereinafter set forth.

Secured to the lower portion of each of the front columns 19 is a pair of substantially triangular guide members 41, the base portion 42 of each member being secured to the column while the back or long side 43 is arranged in close proximity to the ground, thus arranging the hypothenuse 44 of each of the frames in forwardly downwardly inclined position as shown clearly in Figure 1. These guide frames 41 are designed to pass beneath the lower limbs or branches of the cotton plants as the machine moves forwardly and cause the branches to ride up upon the inclined edge 44 to bring the same in position between the picker fingers 33 of the boll removing mechanism.

Opening through the bottom 6 of each of the hoppers or bins 8 which bottom is arranged at an inclination as indicated in dotted lines in Figure 1, is a downwardly extending chute 45 which opens into the lower end of an upwardly and laterally directed endless conveyor casing 46, in which the conveyor 47 operates to carry the cotton bolls to the sides of the machine for discharge into appropriate receivers.

The shaft 48 at the lower end of the endless conveyor may receive its power through the shaft 49 supported exteriorly of the housing 1 and having upon its outer end, a beveled gear pinion 50 adapted to mesh with the beveled gear 14 of the adjacent wheel. Suitable universal joint connections 51 can be made between the shaft 48 and the shaft 49, for the proper operation of the same.

In the operation of the boll picker, above described, the machine is placed astraddle a row of cotton plants and moved forwardly thereover, the guide frame 41 passing beneath the lower branches lifting them as above described so that all of the branches of each plant will pass between the upwardly moving opposed picker fingers 33 and these picker fingers will engage or penetrate the bolls of the plant and remove them therefrom and as the removed bolls are carried upwardly, the rapidly revolving brush cylinders 36 will engage the bolls with the picking fingers 37 carried thereby and throw the same from the picker belt into the adjacent bin 8 from which the bolls will pass to the lower end of the conveyor casing 46 to be removed by the endless conveyor 47.

Having thus described my invention, I claim:

1. A cotton boll picker comprising a wheel supported housing, a pair of columns secured to and depending from each of the front and rear walls of the housing and provided at their lower ends with bearings and at their upper ends with vertical slots, bearing blocks slidably arranged in said slots, brackets secured to and extending upwardly from the upper ends of the columns, adjusting screws having threaded engagement with the brackets and extending into said slots and connected to the bearing blocks, lower rollers journaled in the bearings, upper rollers journaled in the bearing blocks, a belt passing over each vertically alined pair of rollers and provided with picker fingers, cylinders arranged above the upper rollers and journaled in the brackets and provided with brush fingers, means establishing driving connections between the wheels and upper rollers, and means establishing driving connections between the upper rollers and the cylinders.

2. A cotton boll picker comprising a wheel supported housing having its lower side opened, troughs arranged within the housing at opposite sides of the longitudinal center thereof and having hoppers, the hoppers having discharge openings in their bottoms and having their bottoms inclined in the direction of said openings, belts provided with picker fingers, means for supporting the belts from the housing with their upper ends positioned between and above the hoppers, cylinders supported within the housing above the upper ends of the belts and provided with brushing fingers, means for operating the belts and cylinders, chutes extending downwardly from the discharge openings of the hoppers, casings extending laterally and upwardly from the lower ends of the chutes, conveyors within the casing, and conveyor operating means.

In testimony whereof I affix my signature.

ALBERT B. McDONALD.